(12) United States Patent
Nitaki

(10) Patent No.: US 7,024,697 B2
(45) Date of Patent: Apr. 4, 2006

(54) ACCESS RIGHT MANAGING SYSTEM, PORTABLE TERMINAL, GATEWAY AND CONTENTS SERVER

(75) Inventor: Takashi Nitaki, Tokyo (JP)

(73) Assignee: NEC Corporation, Tokyo (JP)

( * ) Notice: Subject to any disclaimer, the term of this patent is extended or adjusted under 35 U.S.C. 154(b) by 755 days.

(21) Appl. No.: 09/740,981

(22) Filed: Dec. 21, 2000

(65) Prior Publication Data

US 2001/0005890 A1    Jun. 28, 2001

(30) Foreign Application Priority Data

Dec. 22, 1999    (JP)    ................................. 11-364989

(51) Int. Cl.
*G06F 17/30*    (2006.01)

(52) U.S. Cl. .............................. 726/26; 726/17; 726/27

(58) Field of Classification Search ................ 713/201, 713/202, 200; 455/414.3; 707/9; 726/26, 726/17; 709/229; 705/51
See application file for complete search history.

(56) References Cited

U.S. PATENT DOCUMENTS

| | | | |
|---|---|---|---|
| 5,903,831 A | 5/1999 | Foti | |
| 6,201,958 B1 | 3/2001 | Boucher | |
| 6,539,481 B1 | 3/2003 | Takahashi et al. | |
| 6,707,889 B1 * | 3/2004 | Saylor et al. ............. | 379/88.04 |
| 2001/0044894 A1 * | 11/2001 | Saito et al. .................. | 713/156 |
| 2002/0002688 A1 * | 1/2002 | Gregg et al. ................ | 713/202 |
| 2002/0046136 A1 | 4/2002 | Kawazoe | |
| 2002/0046174 A1 * | 4/2002 | Sugimori ...................... | 705/51 |
| 2003/0212863 A1 * | 11/2003 | Ganguly et al. ............ | 711/118 |

FOREIGN PATENT DOCUMENTS

| | | |
|---|---|---|
| CN | 1201197 A | 12/1998 |
| CN | 1209712 | 3/1999 |
| CN | 1226367 | 8/1999 |
| EP | 0 604 911 A2 | 7/1994 |
| EP | 0 745 924 A2 | 12/1996 |
| EP | 0 883 076 A2 | 12/1998 |
| GB | 2 317 038 | 3/1998 |
| GB | 2 334 648 A | 8/1999 |
| GB | 2 349 545 A | 11/2000 |
| GB | 2 350 974 A | 12/2000 |
| JP | 8-6784 A | 1/1996 |
| JP | 9-146824 | 6/1997 |
| JP | 9-265443 | 10/1997 |
| JP | 10-173711 | 6/1998 |
| JP | 10-336345 | 12/1998 |
| JP | 11-143827 A | 5/1999 |

(Continued)

*Primary Examiner*—Ho Song
*Assistant Examiner*—Linh L D Son
(74) *Attorney, Agent, or Firm*—Foley & Lardner LLP

(57) ABSTRACT

A gateway manages the right of a portable terminal to access data of various contents services stored in a contents server. When the gateway receives the first request for access from the portable terminal, it assigns a user ID and a password to the same and transmits them to the portable terminal. When another request for use added with the same ID and PW is received, the gateway generates access history information after authenticating the user and grants an access right during a predetermined effective period from the date of the first access. In response to an access during the effective period, contents data acquired from the contents server are transferred to the portable terminal. In the case of an access out of the effective period, the access is interrupted, and continuation of the access right is prompted by an access right continuation notice.

14 Claims, 8 Drawing Sheets

FOREIGN PATENT DOCUMENTS

| | | |
|---|---|---|
| JP | 11-203127 A | 7/1999 |
| JP | 11-250009 | 9/1999 |
| JP | 2000-90033 | 3/2000 |
| WO | WO 97/47152 | 12/1997 |
| WO | 10-313487 | 11/1998 |
| WO | WO 99/10793 | 3/1999 |
| WO | WO 00/71321 A2 | 11/2000 |

* cited by examiner

| | 55 | 56 | 57 | 58 | 59 |
|---|---|---|---|---|---|
| | ID | SERVICE TYPE | EFFECTIVE PERIOD | DATE OF FIRST ACCESS | DATE OF LATEST ACCESS |
| | ID | SERVICE TYPE | EFFECTIVE PERIOD | DATE OF FIRST ACCESS | DATE OF LATEST ACCESS |
| | | | | | |
| | ID | SERVICE TYPE | EFFECTIVE PERIOD | DATE OF FIRST ACCESS | DATE OF LATEST ACCESS |

ACCESS RIGHT MANAGING SYSTEM, PORTABLE TERMINAL, GATEWAY AND CONTENTS SERVER

BACKGROUND OF THE INVENTION

The present invention relates to an access right managing system, a portable terminal, a gateway and a contents server, and, more particularly, to an access right managing system for managing access rights, a portable terminal, a gateway and a contents server for providing various services.

The Internet has recently spread in which computer networks are connected to each other. Various kinds of information can be accessed by acquiring contents data stored in a contents server on the Internet using a portable terminal such as a portable telephone which is capable of communication in various modes. A user who uses a portable terminal to which an access right has been granted in advance by a system transmits a user identifier (hereinafter abbreviated as "ID") and a password (hereinafter abbreviated as "PW") uniquely set for the user before accessing desired information. Authentication on of the access right is made through such a transmission. The desired information can be accessed after the access right is authenticated. Hereinafter, such a system for managing access rights for providing various services is referred to as "access right managing system".

A conventional access right managing system has a portable terminal such as a portable telephone for accessing various kinds of information and a contents server for providing contents data. In such an access right managing system, a portable terminal 11 to which an access right has been granted is connected to a contents server 12 through an Internet 10. After the connection is established, the user acquires desired contents data. The contents data can be displayed on a display unit of the portable terminal 11.

An access right is required to acquire various contents data on a contents server through a portable terminal. Prior to such an access, an application for service for authentication of the user of the portable terminal is submitted to the contents service manager. Such an application may be electronically sent to the contents service manager over the Internet or may alternatively be sent separately as a document using mail or the like. When the contents service manager receives the application, the server managing apparatus for managing the contents server registers the user for tolling. The server managing apparatus transmits a user ID and PW to the portable terminal as a permission for the user to make access. The server managing apparatus also sets the user registration in the contents server. The user who has received the permission can thereafter access to the contents of the contents server using the portable terminal under the user ID and PW to acquire desired request information.

In the conventional access right managing system, however, only a tentative user ID and PW are sent from the contents server manager to a user who has applied for use of the server in consideration to the problem of security. An official ID and PW are normally set after a registration period passes which is several weeks. Access to contents data can be made only after such setting is made. Therefore, a user must conduct tiresome operation of setting the official user ID and PW again.

Especially, when an access to contents is attempted using a portable telephone which acquires contents data described in the HyperText Markup Language (hereinafter abbreviated as "HTML") or the Wireless Markup Language (hereinafter abbreviated as "WML"), no system for making user registration on a network has been established. Therefore, a problem arises in that no access to contents can be made until a registration period of several weeks passes after a registration for tolling.

Further, a rapid increase is expected in the future in the number of accesses to contents using portable telephones which are spreading at a remarkable pace. Therefore, if a registration operation is carried out at a contents server manager each time a user of a portable telephone makes a registration for tolling, registration operations are delayed to result in a delay in the time when users can start using the server. This also results in an increase in the managing cost at the contents server because there is a need for a capacity and a processing capability to manage access rights of increasing users.

SUMMARY OF THE INVENTION

It is an object of the invention to provide an access right managing system, a portable terminal, a gateway and a contents server which allow the management and registration of an access right of a user to be simplified and which allow access rights to be managed at a low cost.

According to a first aspect of the invention, there is provided an access right managing system comprising:

(A) a portable terminal having use request transmitting means for transmitting a request for use of a contents service, contents data receiving means for receiving contents data corresponding to the use request transmitted by the use request transmitting means and display means for displaying information such as characters based on the contents data received by the contents data receiving means;

(B) a gateway having use request receiving means for receiving the use request transmitted by the use request transmitting means, access history information storing means for storing access history information including the time of the first access and a predetermined effective period each time an access is made to the contents service requested by the use request transmitted by the use request transmitting means, access validity determining means for determining whether the use request received by the use request receiving means is within the effective period that starts at the time of the first access based on the access history information stored in the access history information storing means, acquisition requesting means for transmitting a request for acquisition of contents data when the use request is determined to be within the effective period by the access validity determining means, acquisition-requested contents data receiving means for receiving contents data corresponding to the request for acquisition transmitted by the acquisition requesting means and contents data transfer means for transferring the contents data received by the acquisition-requested contents data receiving means to the portable terminal; and (C) a contents server having contents data storing means for storing contents data associated with each contents service in advance and contents data transmitting means for reading the contents data requested by the acquisition requesting means from the contents data storing means and for transmitting the same to the gateway.

According to the first aspect of the invention, the gateway is provided for the portable terminal for accessing contents data stored in a contents server on the Internet. For example, the gateway receives a use request for a contents service transmitted by the portable terminal. The access history information storing means stores access history information including the time of the first access and a predetermined effective period each time an access is made to the contents service requested by the use request. The access validity determining means determines whether the use request is within the effective period that starts at the time of the first access based on the access history information stored in the access history information storing means. If it is determined to be within the effective period, the contents server is requested to acquire the contents data, and the acquired contents data are transferred to the portable terminal.

According to a second aspect of the invention, there is provided an access right managing system comprising:

(A) a portable terminal having first use request transmitting means for transmitting a request for use of a contents service, identification information receiving means for receiving predetermined identification information corresponding to the use request transmitted by the first use request transmitting means, identification information accepting means for accepting the input of an identifier and a password for the request for use of the contents service, second use request transmitting means for transmitting a use request including the identifier and password accepted by the identification information accepting means, contents data receiving means for receiving contents data corresponding to the use request transmitted by the second use request transmitting means and display means for displaying information such as characters based on the contents data received by the contents data receiving means;

(B) a gateway having use request receiving means for receiving the use request transmitted by the use request transmitting means, first access request determining means for determining whether the use request received by the use request receiving means is the first request for access to the contents service, identification information transmitting means for assigning an identifier and a password to the request when it is determined to be the first access request by the first access request determining means and for transmitting the same to the portable terminal, authenticating means for authenticating the use request based on the identifier and password transmitted by the identification information transmitting means when it is determined not to be the first access request by the first access request determining means, access history information generating means for generating access history information including the time of the first access and a predetermined effective period each time an access is made to the contents service requested by the use request when the use request is authenticated by the authenticating means, access validity determining means for determining whether the use request received by the use request receiving means is within the effective period that starts at the time of the first access based on the access history information generated by the access history information generating means, acquisition requesting means for transmitting a request for acquisition of contents data when the use request is determined to be within the effective period by the access validity determining means, acquisition-requested contents data receiving means for receiving contents data corresponding to the request for acquisition transmitted by the acquisition requesting means and contents data transfer means for transferring the contents data received by the acquisition-requested contents data receiving means to the portable terminal; and (C) a contents server having contents data storing means for storing contents data associated with each contents service in advance and contents data transmitting means for reading the contents data requested by the acquisition requesting means from the contents data storing means and for transmitting the same to the gateway.

According to the second aspect of the invention, the gateway is provided for the portable terminal which accesses contents data stored in a contents server on the Internet. For example, the gateway receives a request for use of a contents service transmitted by the portable terminal. The first access request determining means determines whether the use request is the first request for access to the contents service. When it is determined to be the first access request, an identifier and a password are assigned to the same and are transmitted to the portable terminal as identification information. Upon receipt of the identification information, the portable terminal notifies the user of the portable terminal with the same information and accepts the identifier and password from the user again and transmits the same to the gateway as a use request. When the use request received from the first request determining means is determined not to be the first access request, the use request is authenticated by the authenticating means based on the identifier and password transmitted to the portable terminal at the time of the reception of the first access request. When the use request is authenticated thereafter, access history information including the time of the first access and a predetermined effective period is generated each time an access is made to the contents service requested by the use request. The access validity determining means determines whether the use request is within the effective period that starts at the time of the first access based on the access history information. If it is determined to be within the effective period, the contents server is requested to acquire the contents data, and the acquired contents data are transferred to the portable terminal.

A third aspect of the invention characterizes in that the identification information transmitting means confirms with the portable terminal whether to access the contents server for which the use request has been made before transmitting the assigned identifier and password to the portable terminal.

According to the third aspect of the invention, the gateway confirms with the portable terminal whether to access the contents server for which the use request has been made before transmitting the assigned identifier and password to the portable terminal. Therefore, it is possible to prevent the generation of useless access history information when the user of the portable terminal transmits the first access request as a result of an erroneous operation.

A fourth aspect of the invention characterizes in that the gateway comprises continuation notice transmitting means for transmitting a predetermined access right continuation notice to the portable terminal when the access validity determining means determines that the use request is not within the effective period. The gateway further comprises the gateway comprises continuation process means for performing a predetermined access right continuation process based on instruction information received from the portable terminal corresponding to the access right continuation notice transmitted by the continuation notice transmitting means. The portable terminal comprises instruction information accepting means for receiving the access right continuation notice and for accepting the instruction information on whether to continue to hold the access right based on the same notice, and comprises instruction information transmitting means for transmitting the instruction information accepted by the instruction information accepting means to the gateway.

According to the fourth aspect of the invention, a predetermined access right continuation notice is transmitted to the portable terminal when a received use request is out of the effective period. A predetermined access right continuation process is performed based on instruction information accepted by the user of the portable terminal based on the same. Thus, a permission for access can be easily issued by granting the access right with an effective period, which makes it possible to clear the problem of security. Further, since a semi-permanent permission for access can be granted as in the prior art if the user wishes so by taking the access right continuation procedure associated with the effective period, which consequently makes it possible to simplify the management and registration of the access rights of users.

An access right managing system according to a fifth aspect of the invention characterizes in that the contents data transfer means transfers the contents data to the portable terminal after converting into a predetermined data format corresponding to the display mode of the display means of the portable terminal. The contents data is received by the acquisition-requested contents data receiving means.

According to the fifth aspect of the invention, since data are converted by the gateway into an optimum format of display data associated with the portable terminal regardless of the data format of the contents data stored in the contents server, the processing load of the portable terminal can be reduced.

An access right managing system according to a sixth aspect of the invention characterizes in that the access history information includes the date of the latest access and a predetermined effective period and in that an access within the effective period that starts from the date of the latest access is regarded valid.

According to the sixth aspect of the invention, a use request is determined to be valid when the access right is within the effective period that starts from the date of the latest access.

According to a seventh aspect of the invention, there is provided an access managing system according to the fifth aspect, characterized in that the contents data transfer means converts the data into contents data described in the Wireless Markup Language.

According to the seventh aspect of the invention, adaptation to a WAP (Wireless Application Protocol) system is facilitated because the contents data transfer means converts the data into contents data described in the Wireless Markup Language.

According to an eighth aspect of the invention, there is provided an access managing system according to any of the fifth through seventh aspects, characterized in that the portable terminal is a portable telephone.

According to a ninth aspect of the invention there is provided a portable terminal comprising:

(A) use request transmitting means for transmitting a request for use of a contents service;

(B) contents data receiving means for receiving contents data acquired when the use request transmitted by the use request transmitting means is within a predetermined effective period that starts from the time of the first access; and (C) display means for displaying information such as characters based on the contents data received by the contents data receiving means.

According to the ninth aspect of the invention, contents data acquired when the use request transmitted by the use request transmitting means is within a predetermined effective period that starts from the time of the first access are received and displayed by the display means.

According to a tenth aspect of the invention, there is provided a portable terminal comprising:

(A) first use request transmitting means for transmitting a request for use of a contents service;

(B) identification information receiving means for receiving predetermined identification information when the use request transmitted by the first use request transmitting means is the first request for the contents service;

(C) identification information accepting means for accepting the input of an identifier and a password for the request for use of the contents service;

(D) second use request transmitting means for transmitting a use request including the identifier and password accepted by the identification information accepting means;

(E) contents data receiving means for receiving contents data when authentication is made based on the use request transmitted by the second use request transmitting means and when the use request is within a predetermined effective period that starts from the time of the first access to the contents service; and (F) display means for displaying information such as characters based on the contents data received by the contents data receiving means.

According to the tenth aspect of the invention, authentication is made on predetermined identification information received corresponding to the first use request of the contents service transmitted by the first use request transmitting means of the portable terminal. Authentication is made based on the second use request including an identifier and a password input by the user of the terminal. Thereafter, contents data acquired within the predetermined period that starts from the time of the first access are received and displayed by the display means.

According to an eleventh aspect of the invention, there is provided a gateway comprising:

(A) use request receiving means for receiving a request for use of a contents service;

(B) access history information storing means for storing access history information including the time of the first access and a predetermined effective period each time an access is made to the contents service;

(C) access validity determining means for determining whether the use request received by the use request receiving means is within the effective period that starts at the time of the first access based on the access history information stored in the access history information storing means;

(D) acquisition requesting means for transmitting a request for acquisition of contents data when the use request is determined to be within the effective period by the access validity determining means;

(E) acquisition-requested contents data receiving means for receiving contents data corresponding to the request for acquisition transmitted by the acquisition requesting means; and (F) contents data transfer means for transferring the contents data received by the acquisition-requested contents data receiving means.

According to the eleventh aspect of the invention, the access history information storing means is provided at the gateway. The gateway stores access history information including the time of the first access and a predetermined period at each access which is a request for use of the contents service received by the use request receiving means. The access validity determining means determines whether the received use request is within the effective period that starts at the time of the first access and, if it is determined to be within the effective period, a request for acquisition of contents data is transmitted. When the relevant contents data are received, it is transferred to the transmitter of the use request.

According to a twelfth aspect of the invention, there is provided a gateway comprising:

(A) use request receiving means for receiving a request for use of a contents service;

(B) first access request determining means for determining whether the use request received by the use request receiving means is the first access request to the contents service;

(C) identification information transmitting means for assigning an identifier and a password for transmitting them to the transmitter of the use request when it is determined to be the first access request by the first access request determining means;

(D) authenticating means for authenticating the use request based on the identifier and password transmitted by the identification information transmitting means when it is determined not to be the first access request by the first access request determining means;

(E) access history information generating means for generating access history information including the time of the first access to the contents service requested by the use request and a predetermined effective period when the use request is authenticated by the authenticating means;

(F) access validity determining means for means for determining whether the use request received by the use request receiving means is within the effective period that starts from the time of the first access based on the access history information generated by the access history information generating means;

(G) acquisition requesting means for transmitting a request for the acquisition of contents data when the use request is determined to be within the effective period by the access validity determining means; and (H) acquisition-requested contents data receiving means for receiving contents data corresponding to the acquisition request transmitted by the acquisition requesting means; and (I) contents data transfer means for transferring the contents data received by the acquisition-requested contents data receiving means to the transmitter of the use request.

According to the twelfth aspect of the invention, the access history information generating means is provided at the gateway. The access history information generating means stores access history information including the time of first access and a predetermined effective period at each access which is a request for use of the contents service received by the use request receiving means. When a use request of the contents service is received, it is first determined whether it is the first access request. If it is determined to be the first request, an identifier and a password are assigned and transmitted to the transmitter of the use request. If it is determined not to be the first access request, authentication is made based on the identifier and password included in the received use request. Thereafter, it is determined whether the request is within the predetermined effective period that starts at the time of the first access based on the access history information. If it is determined to be within the effective period, a request for the acquisition of contents data is transmitted. When the relevant contents data are received, it is transferred to the transmitter of the use request.

A gateway according to a thirteenth aspect of the invention characterizes in that the contents data transfer means converting into a predetermined data format corresponding to the mode of display of contents data at the transmitter of the acquisition request. Thereafter, the contents data transfer means transfers the contents data receiving by the acquisition-requested contents data transmitting means to the portable terminal.

According to the thirteenth aspect of the invention, since data are converted by the gateway into an optimum display data format corresponding to the portable terminal regardless of the data format of the contents data stored in the contents server, the processing load of the portable terminal can be reduced.

According to a fourteenth aspect of the invention, there is provided a contents server comprising:

(A) contents data storing means for storing contents data associated with each contents service in advance;

(B) contents data acquisition request receiving means for receiving an acquisition request to the contents service when the acquisition request is within a predetermined effective period that starts at the time of the first access to the contents service; and (C) contents data transmitting means for reading the contents data requested by the acquisition request received by the contents data acquisition request receiving means from the contents data storing means and for transmitting the same.

According to the fourteenth aspect of the invention, contents data for each contents service are stored in the contents server in advance. Contents data associated with an acquisition request to the contents server are transmitted to the transmitter of the acquisition request based on the acquisition request only when it is within the predetermined effective period that starts a the time of the first access to the contents service.

According to a fifteenth aspect of the invention, there is provided a contents server comprising:

(A) contents data storing means for storing contents data associated with each contents service in advance;

(B) contents data acquisition request receiving means for receiving an acquisition request to the contents service when predetermined authentication information is once returned and then authenticated for the acquisition request and when it is within a predetermined effective period that starts at the time of the first access to the contents service; and (C) contents data transmitting means for reading the contents data requested by the acquisition request received by the contents data acquisition request receiving means from the contents data storing means and for transmitting the same.

According to the fifteenth aspect of the invention, contents data for each contents service are stored in the contents server in advance. Predetermined identification information is once returned for an acquisition request to the contents server. The contents data are transmitted to the transmitter of the acquisition request based on the received acquisition request only when another acquisition request authenticated based on the identification information is within the predetermined effective period that starts at the time of the first access to the contents service.

According to a sixteenth aspect of the invention, there is provided an access right managing system comprising:

(A) a portable terminal for transmitting a request for use of a contents service through a network and displaying information such as characters based on contents data received corresponding to the use request;

(B) a gateway for receiving the use request through the network, transmitting a contents data acquisition request on the Internet for each access to each contents service based on access history information including the time of the first access and a predetermined effective period when the use request is within the effective period and transferring the received contents data to the portable terminal corresponding to the acquisition request; and (C) a contents server for storing contents data for each contents service in advance and for transmitting the relevant contents data to the gateway through the Internet based on the acquisition request received through the Internet.

According to the sixteenth aspect of the invention, a gateway is provided for a portable terminal which accesses contents data stored, for example, in a contents server on the Internet. The gateway receives a use request of a contents service transmitted from the portable terminal. Access history information including the time of the first access and a predetermined effective period is stored by the access history information storing means for each access to the contents service requested by the use request. It is determined whether the use request is within the effective period that starts at the time of the first access based on the access history information stored in the access history information storing means. If it is determined to be within the effective period, the contents server is requested to acquire contents data, and the acquired contents data are transferred to the portable terminal.

According to a seventeenth aspect of the invention, there is provided an access right managing system comprising:

(A) a portable terminal for receiving predetermined identification information corresponding to a first request for use of a contents service transmitted through a network, transmitting a second request for use including an identifier and a password for the request for use of the contents service input based on the same and displaying information such as characters based on contents data corresponding to the second request for use;

(B) a gateway having contents data transfer means for transmitting the assigned identifier and password to the portable terminal when the first request for use received through the network is the first request for use of the contents service, transmitting a request for acquisition of contents data when the received second request for use is determined to be within a predetermined effective period that starts at the time of the first access based on access history information including the time of the first access and the effective period at each access to each contents service after the second request is authenticated based on the identifier and password and transferring contents data received corresponding to the acquisition request to the portable terminal; and (C) a contents server for storing contents data for each contents service and for transmitting relevant contents data to the gateway through the Internet based on an acquisition request received through the Internet.

According to the seventeenth aspect of the invention, a gateway is provided for a portable terminal which accesses contents data stored in, for example, a contents server on the Internet. The gateway receives a use request of a contents service transmitted by the portable terminal. The gateway determines whether the use request is the first request for access to the contents service. An identifier and a password are assigned and transmitted to the portable terminal as identification information when the request for use is the first request for access to the contents service. Upon receipt of the identification information, the portable terminal notifies the user of the portable terminal of the information, accepts the identifier and password again from the user and transmits the same to the gateway as a request for use.

When the use request received is determined not to be the first access request, the use request is authenticated with authenticating means based on an identifier and a password, the identifier and the password being transmitted to the portable terminal at the time in which first access request receives. Thereafter, access history information including the time of the first access and a predetermined effective period is generated for each access to the contents service requested by the request for use. It is determined whether the use request is within the effective period that starts from the time of the first access based on the access history information. If it is determined to be within the effective period, the contents server is requested to acquire contents data, and the acquired contents data are transferred to the portable terminal.

DESCRIPTION OF THE PREFERRED EMBODIMENT

The present invention relates to an access right managing system, a portable terminal, a gateway and a contents server, and, more particularly, to an access right managing system for managing access rights, a portable terminal, a gateway and a contents server for providing various services.

The Internet has recently spread in which computer networks are connected to each other. Various kinds of information can be accessed by acquiring contents data stored in a contents server on the Internet using a portable terminal such as a portable telephone which is capable of communication in various modes. A user who uses a portable terminal to which an access right has been granted in advance by a system transmits a user identifier (hereinafter abbreviated as "ID") and a password (hereinafter abbreviated as "PW") uniquely set for the user before accessing desired information. Authentication on of the access right is made through such a transmission. The desired information can be accessed after the access right is authenticated. Hereinafter, such a system for managing access rights for providing various services is referred to as "access right managing system".

Figure 1:
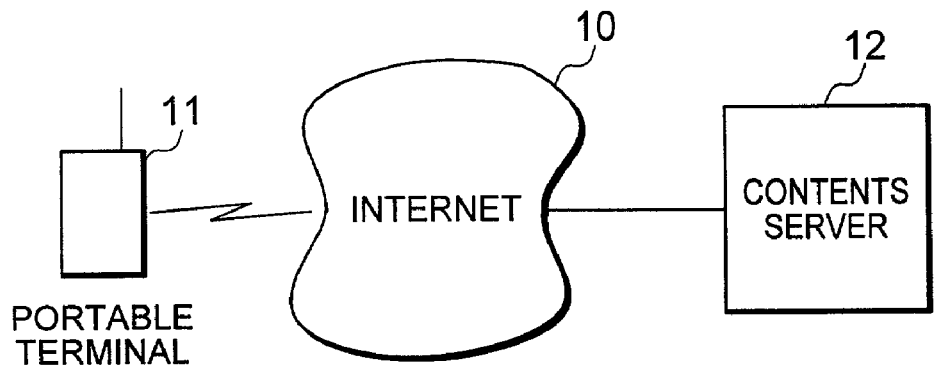
FIG. 1 is a configuration diagram schematically showing a configuration of a conventional access right managing system.

FIG. 1 schematically shows a configuration of a conventional access right managing system. The conventional access right managing system has a portable terminal such as a portable telephone for accessing various kinds of information and a contents server for providing contents data. In the access right managing system, a portable terminal 11 to which an access right has been granted is connected to a contents server 12 through an Internet 10. After the connection is established, the user acquires desired contents data. The contents data can be displayed on a display unit (not shown) of the portable terminal 11.

Figure 2:
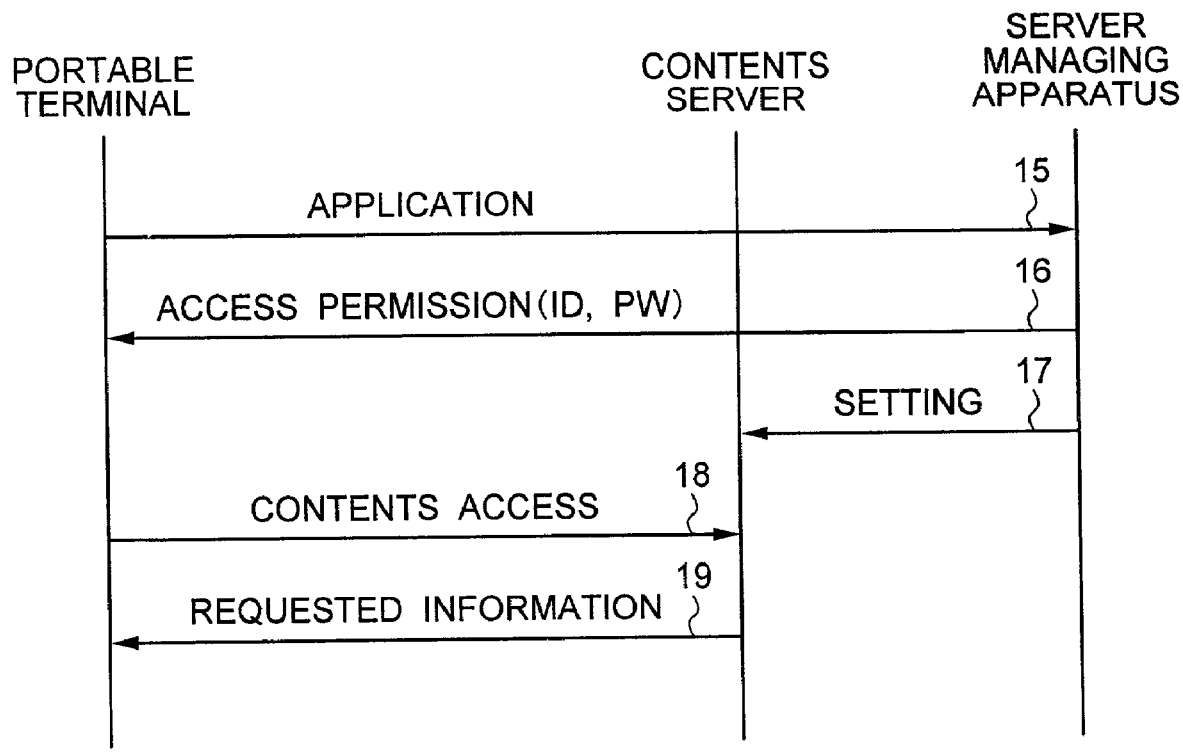
FIG. 2 is a sequence diagram schematically showing a sequence for acquiring contents data in a conventional access right managing system.

FIG. 2 schematically shows a sequence for acquiring contents data in the access right managing system shown in FIG. 1. An access right is required to acquire various contents data on the contents server 12 through the portable terminal 11. Prior to such an access, an application for service 15 for authentication of the user of the portable terminal 11 is submitted to the contents service manager. The application 15 may be electronically sent to the contents service manager over the Internet 10 or may alternatively be sent separately as a document using mail or the like. When the contents service manager receives the application 15, the server managing apparatus for managing the contents server 12 registers the user for tolling. The server managing apparatus transmits a user ID and PW to the portable terminal as a permission 16 for the user to make access. The server managing apparatus also sets the user registration in the contents server (arrow 17). The user who has received the permission can thereafter access to the contents of the contents server 12 using the portable terminal 11 under the user ID and PW to acquire desired request information 19.

In the conventional access right managing system, however, only a tentative user ID and PW are sent from the contents server manager to a user who has applied for use of the server in consideration to the problem of security. An official ID and PW are normally set after a registration period passes which is several weeks. Access to contents data can be made only after such setting is made. Therefore, a user must conduct tiresome operation of setting the official user ID and PW again. Especially, when an access to contents is attempted using a portable telephone which acquires contents data described in the HyperText Markup Language (hereinafter abbreviated as "HTML") or the Wireless Markup Language (hereinafter abbreviated as "WML"), since no system for making user registration on a network has been established, a problem arises in that no access to contents can be made until a registration period of several weeks passes after a registration for tolling.

Further, a rapid increase is expected in the future in the number of accesses to contents using portable telephones which are spreading at a remarkable pace. Therefore, if a registration operation is carried out at a contents server manager each time a user of a portable telephone makes a registration for tolling, registration operations are delayed to result in a delay in the time when users can start using the server. This also results in an increase in the managing cost at the contents server because there is a need for a capacity and a processing capability to manage access rights of increasing users.

The present invention was conceived in order to solve the above-described problem. A preferred embodiment will now specifically be described.

Figure 3:
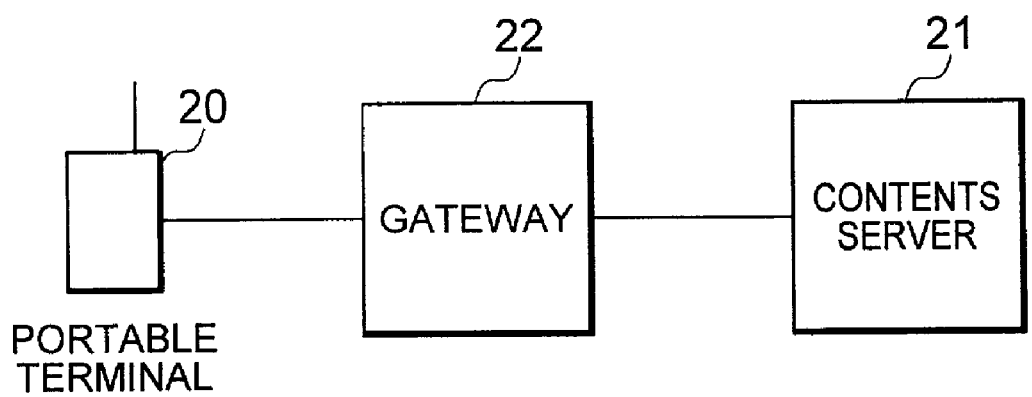
FIG. 3 is a configuration diagram schematically showing a configuration of an access right managing system according to an embodiment of the invention.

FIG. 3 schematically shows a configuration of an access right managing system according to the invention. In the access right managing system of the present embodiment, a portable terminal 20 such as a portable telephone and a contents server 21 are connected through a gateway 22. The portable terminal 20 has a browser function for acquiring contents data stored in the contents server 21 on the Internet through the gateway 22 and for displaying it on a display unit (not shown). The gateway 22 manages the access right of a user of the portable terminal 20. The gateway 22 also transmits contents data downloaded from the contents server to the portable terminal 20 of a user to whom an access right has been granted after converting the data into contents data such as characters in a mode of display suitable for the portable terminal 20. For example, in a case of a portable terminal 20 having a browser function to allow contents data in the WML format to be looked at, when there is a request for access to contents data in the HTML format from the portable terminal 20, contents data downloaded from the contents server 21 are converted into contents data in the WML format which can be displayed on the display unit of the portable terminal 20. The contents server 21 is provided on the Internet and provides a service of providing contents data requested by a user of the portable terminal 20.

The access right managing system of the present embodiment is characterized in that the gateway 22 manages the history of access of each user and manages an access right by setting an effective period for the same. Since it is required to manage only access rights of users in a period for use instead of managing access rights of all users, the memory capacity and processing capability required for the management of access rights can be reduced to achieve a cost reduction. Further, by setting a limit for the period of use of an access right, an access right can be quickly granted when there is an access request to avoid the problem of security.

A major part of the access right managing system of the present embodiment will now be described.

Figure 4:
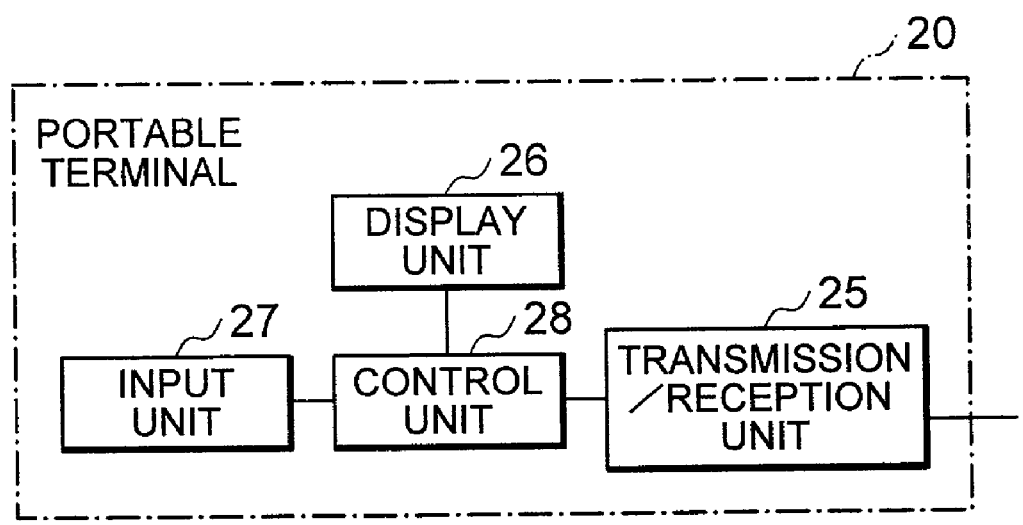
FIG. 4 is a block diagram showing a major part of a configuration of a portable terminal of the embodiment.

FIG. 4 shows a major part of a configuration of the portable terminal 20 of the present embodiment. The portable terminal 20 has a transmission/reception unit 25 for transmitting an access request through the Internet and for receiving the requested contents data, a display unit 26 for displaying the contents data received by the transmission/reception unit 25, an input unit 27 for inputting a user ID and PW which are assigned in advance as a permission for access, and a control unit 28 for controlling those units.

The portable terminal 20 selects contents data to be accessed according to a menu screen stored in a storage unit (not shown). Desired contents data can be looked at on the portable terminal 20 by inputting the user ID and PW assigned in advance as an access permission or by inputting an address which specifies the destination of the access. For example, the menu stored in the portable terminal 20 is constituted by an access request screen to allow selection of one of contents services for which the user has already been registered and a screen for the first access. The user selects either of the screens. When the access request screen is selected, a desired contents service can be accessed by selecting the desired contents service. When the screen for the first access is selected, the user transmits a request for use by inputting an address that specifies the destination of the access. After the user is registered by the gateway 22, the access is enabled by selecting the access request screen this time to select the desired contents service. For an access right to such a contents service, the gateway 22 sets a predetermined effective period which starts at the date of the first access. In the case of expiration of the effective period for a right to access a contents service for which an access request has been made, a notice for continuation for the same is sent, and an access right is acquired again based on the same.

The control unit 28 has a central processing unit (hereinafter abbreviated as "CPU") which is not shown. The control unit 28 executes various processes such as a browser function according to a control program stored in a predetermined storage device such as a read only memory (hereinafter abbreviated as "ROM"). A description will now be made on the processes executed by the CPU based on the control program.

Figure 5:
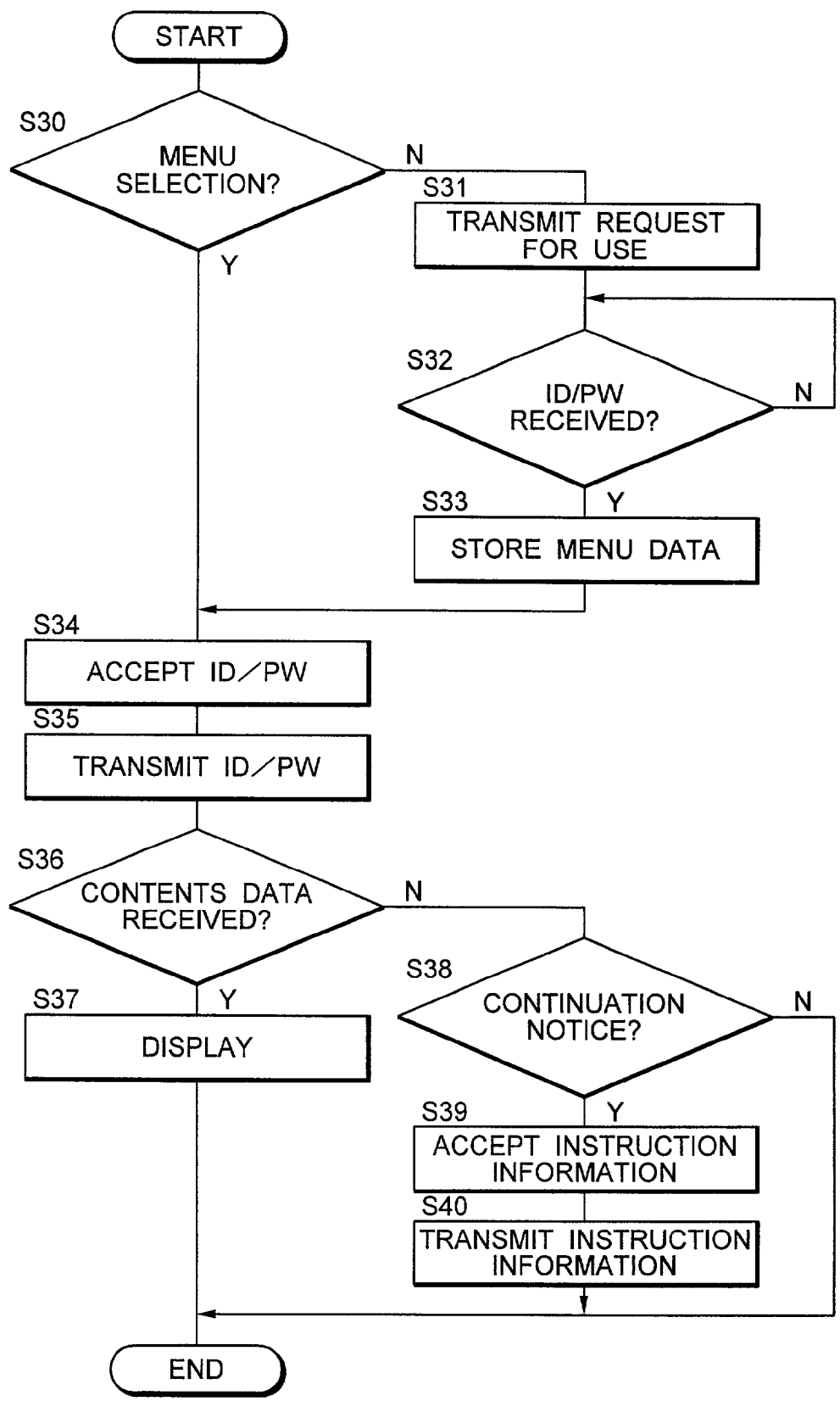
FIG. 5 is a flow chart showing a schematic example of the contents of processes at the portable terminal of the embodiment.

FIG. 5 shows a schematic example of a contents access processing system in the portable terminal 20 of the present embodiment. First, menu screen data stored in a storage device (not shown) are read. After the menu screen data are displayed at step S30, either the access request screen or first access screen is selected for a contents service for which the user has been registered. When the access request screen is not selected (step S30: N), the first access screen is selected, and an address which specifies a destination of access is input through the input unit 27. At step S31, the address is transmitted to the gateway 22 as a request for use. Subsequently, a standby state is entered to wait for the reception of a user ID and PW associated with the request which are assigned by the gateway 22 (step S32: N). When the user ID and PW are received (step S32: Y), menu data for accessing the requested contents service which are simultaneously received are stored in the storage device and are registered as access request screen data (step S33).

When the access request screen is selected at step S30 (step S30: Y) or after a request for use is transmitted at step S31 to register a new menu screen, the input of the ID and PW is accepted according to the menu screen for accessing the relevant contents service (step S34). Thereafter, a request for use consisting of the ID and PW accepted at step S34 is transmitted to the gateway 22 at step S35. At step S36, reception of contents data associated with the request for use is monitored (step S36).

When the requested contents data are received (step S36: Y), the contents data are displayed to terminate (end) the series of processes at step S37. When the contents data are not received at step S36 (step S36: N), the CPU determines whether it is attributable to a continuation notice associated with the expiration of the access right (step S38). If it is determined that the received data are a continuation notice (step S38: Y), an instruction information indicating whether to maintain the access right is accepted at step S39. Then, the instruction information is transmitted to terminate (end) the series of processes at step S40. If it is determined at step S38 that the received data are not a continuation notice (step S38: N), the series of processes are terminated without any further process (end).

When an access request is received from the portable terminal 20 and the access request is valid, the gateway 22 downloads contents data from the contents server 21 and transfers the contents data to the portable terminal 20. The gateway 22 will now be described.

Figures 6, 7:
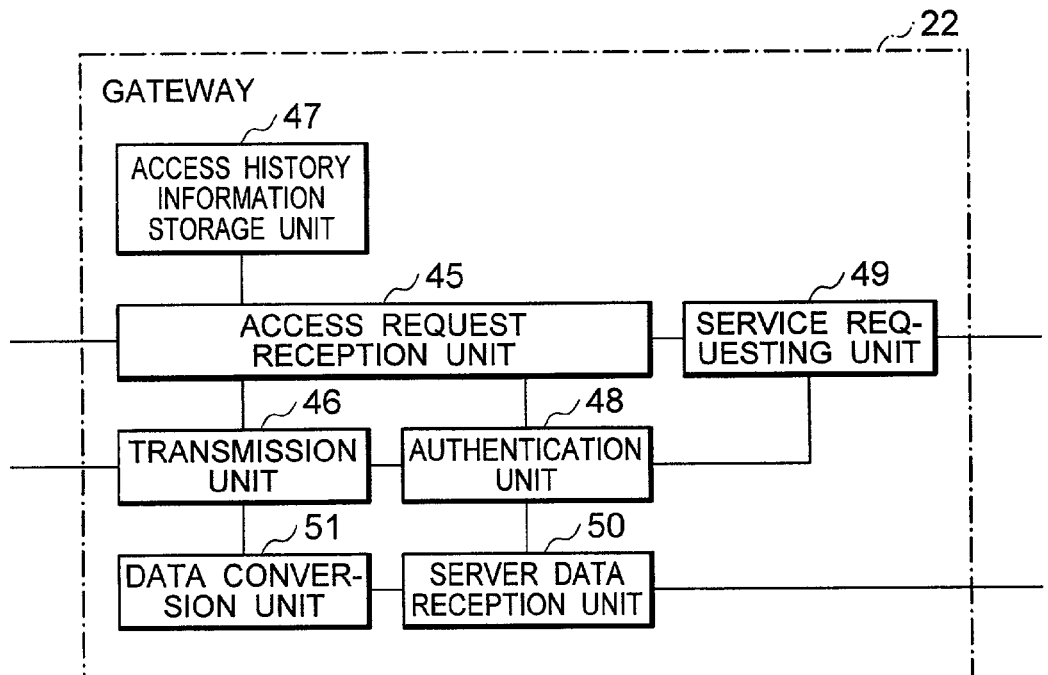
FIG. 6 is a block diagram showing a major part of a configuration of a gateway of the embodiment.
FIG. 7 is an illustration schematically showing access history information of the embodiment.

FIG. 6 shows a major part of a configuration of the gateway 22 of the present embodiment. The gateway 22 has:

an access request reception unit 45 for receiving a request for use from the portable terminal 20;

a transmission unit 46 for transmitting pre-assigned user ID and PW or contents data from the contents server 21 to the portable terminal 20 when the request for use is intended for the first access;

an access history information storage unit 47 for storing access history information for managing history of access of each user to various contents service;

an authentication unit 48 for authenticating the user from the ID and PW included in the received request for use input with the portable terminal 20 when the request for use received by the access request reception unit 45 is not intended for the first access and when the access right is valid in light of the access history information; and a service requesting unit 49 for requesting the contents server 21 to acquire contents data when the user is authenticated by the authentication unit 48.

Further, the gateway 22 has a service data reception unit 50 for receiving service data which are contents data received from the contents server 21 according to the service request transmitted by the service requesting unit 49 and a data conversion unit 50 for converting the data from the service data reception unit 49 into a data format which is optimum for the mode of display of the portable terminal 20.

When a request for use from the portable terminal 20 is intended for the first access to a contents service for which the user has not been registered, the gateway 22 assigns a user ID and PW. The gateway 22 also transmits the user ID and user PW to the portable terminal 20 along with menu data which are prepared for each contents service. Furthermore, when another request for use from the portable terminal 20 is authenticated, the gateway 22 generates access history information. Thereafter, the gateway 22 sets an access right which is valid in a predetermined period starting at the data of the first access and reflects the same on the tolling system.

FIG. 7 schematically shows the access history information stored in the access history information storage unit 47 of the gateway 22 of the present embodiment. Items stored as the access history information for each user ID 55 are a service type 56 indicating the type of service of the requested contents service, an effective period 57 for a right to access the contents service, the data of the first access 58 to the contents service and the date of the latest access 59. The service type 56, effective period 57, first access data 58 and latest access date 59 are stored in association with each other.

The data conversion unit 51 is capable of converting contents data received from the contents server 21 into a data format corresponding to the browser function and the display unit of the portable terminal 20. For example, when contents data stored in the contents server 21 in association with a valid access right is in the HTML format, the data conversion unit 51 downloads the HTML data and converts the same into contents data, for example, in the WML format. After the conversion, the WML data are transmitted to the portable terminal 20. Therefore, the portable terminal 20 is not required to have a data conversion function for displaying the data on the display unit. That is, the portable terminal 20 is required to have only a browser function in the WML format.

The gateway 22 has a CPU (not shown). The gateway 22 executes the above-described various processes according to a control program stored in a predetermined storage device such as a ROM. The processes executed by the CPU based on the control program will now be described.

Figure 8:
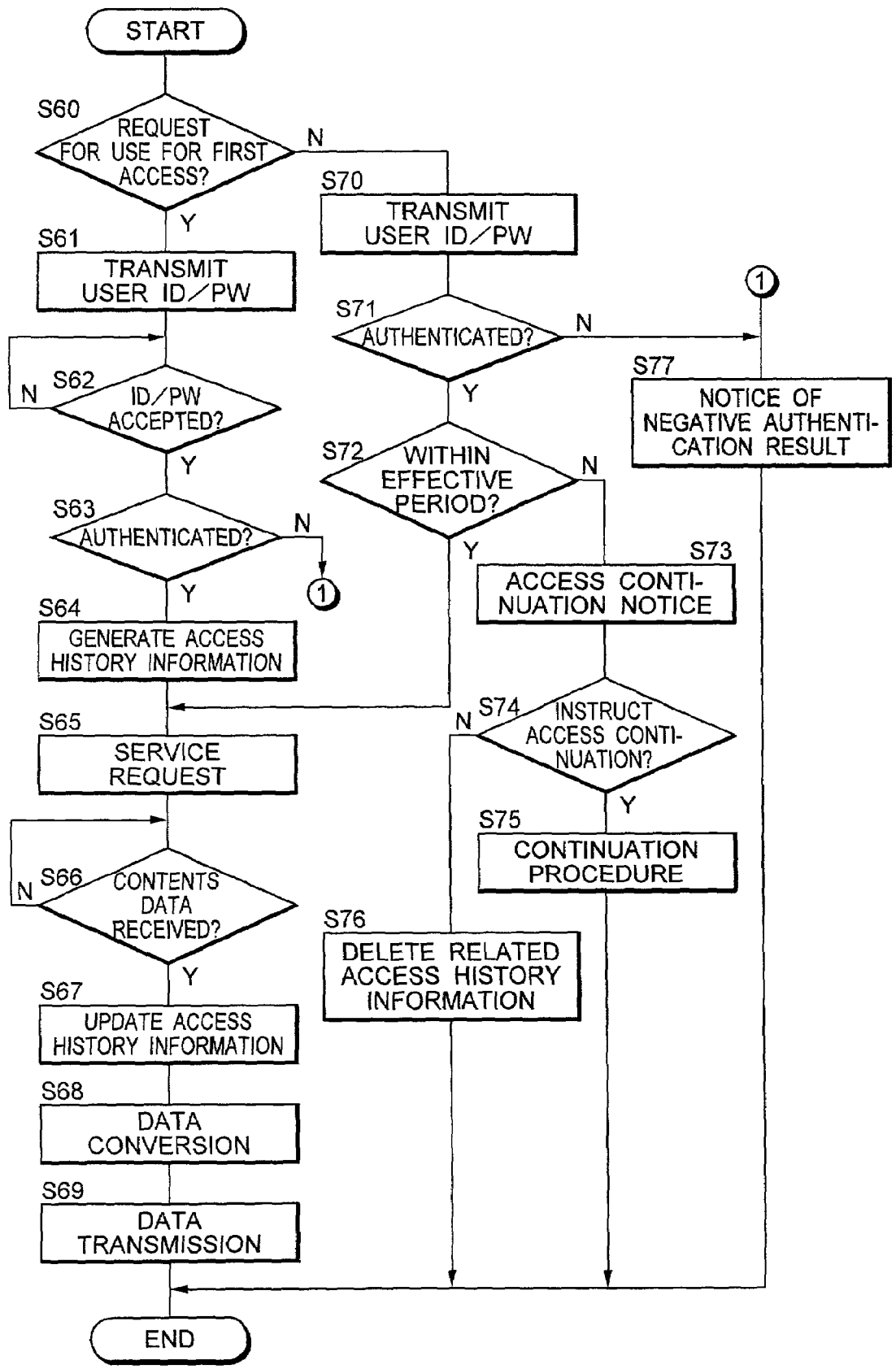
FIG. 8 is a flow chart showing a schematic example of the contents of processes at the gateway of the embodiment.

FIG. 8 schematically shows an example of the contents of processes at the gateway 22 of the present embodiment.

First, when a request for use for the first access is received (step S60: Y), since no registration is made in the access history information, a user ID and a user PW are set for each request for use. After they are set, at step S61, the user ID and user PW are transmitted to the portable terminal which has made the request for use. For example, it can be determined whether the request for use is intended for the first access from whether it is a request for use in a predetermined format added with an ID and PW.

Subsequently, a state is entered in which it is monitored whether the access request reception unit 45 receives another request for use from the portable terminal (step S62: N). When another request for use is received from the portable terminal as an ID and PW (step S62: Y), it is determined at step S63 whether the received ID and PW agree with the ID and PW transmitted at step S61 to authenticate the user. If there is no problem in the authentication result (step S63: Y), access history information as shown in FIG. 7 is generated (step S64). Thereafter, the contents server 21 is requested to acquire contents data at step S65. Subsequently, a state is entered in which reception of the relevant contents data is monitored (step S66: N). When the relevant contents data are received (step S66: Y), the date of the latest access in the access history information 67 is updated (step S67). Thereafter, the contents data are converted into a data format corresponding to the mode of display of the display unit of the portable terminal 20 at step S68. Then, the converted contents data are transmitted to the portable terminal 20 to terminate (end) the series of processes at step S69.

When step S63 provides a negative authentication result (step S63: N), the portable terminal 20 is notified of the fact that there is a problem in the authentication result (step S77), and this terminates the series of processes (end).

When the request received at step S60 is an access request for a contents service for which the user has already been registered instead of a request for use intended for the first access (step S60: N), the user ID and user PW included in the request for use are extracted (step S70). At step S71, they are compared with the user ID and PW which have been assigned and transmitted by the gateway 22 at the time of the first access. When this provides a positive authentication result (step S71: Y), the CPU determines whether the request for use is within the effective period by referring to the access history information stored in the access history storage unit 47 in association with the received ID (step S72). If it is determined that the request for use is within the effective period (step S72: Y), the contents server 21 is requested to acquire contents data at step S65 (step S65).

When step S72 provides a negative authentication result (S71: N), the portable terminal 20 is notified of the fact that there is a problem in the authentication result at step S77 (step S77), and this terminates the series of processes (end).

If it is determined at step S72 that the request for use is not within the effective period (step S72: N), the CPU determines that there is no access right, reads screen data for an access right continuation notice which are prepared in advance and transmits the same to the portable terminal 20 along with the date of the latest access (step S73). Further, when the CPU receives continuation instruction information indicating whether to maintain the access right from the portable terminal 20 at step S74, it determines whether the information instructs the continuation of the access right. If it is determined that the continuation of the access right is instructed (step S74: Y), for example, a predetermined access right continuation procedure such as regeneration of the access history information is taken (step S75), which terminates the series of processes (end). On the contrary, when it is determined at step S74 that the continuation of the access right is not instructed (step S74: N), access history associated with the ID is deleted from the access history information (step S76), and this terminates the series of processes (end).

A description will now be made on the contents server 21 which receives such a service request from the gateway 22 and which transmits contents data stored in advance.

Figure 9:
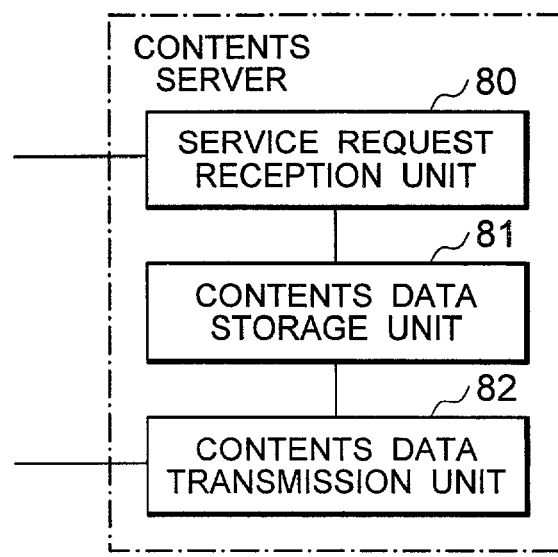
FIG. 9 is a block diagram showing a major part of a configuration of a contents of the embodiment.

FIG. 9 shows a major part of a configuration of the contents server 21 of the present embodiment. The contents server 21 has service requests reception unit 80 for receiving a service request transmitted by the gateway 22, a contents data storage unit 81 for storing various contents data for each of services to be provided and a contents data transmission unit 81 for acquiring contents data identified by a service request received by the service request reception unit 80 and transmitting the same to the gateway 22.

Such a contents server 21 has a CPU which is not shown and can acquire and transmit contents data requested by the gateway 22 according to a control program stored in a predetermined storage device such as a ROM. A description will now be made on processes executed by the CPU based on the control program.

Figure 10:
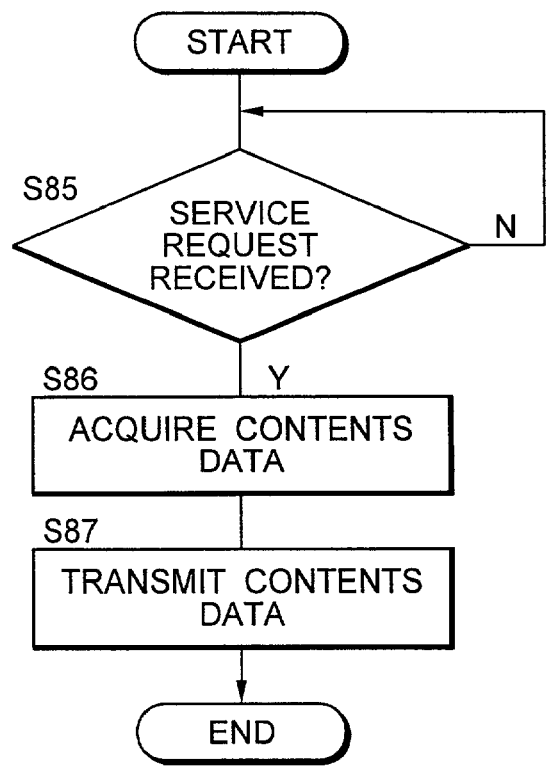
FIG. 10 is a flow chart showing a schematic example of the contents of processes at the contents server of the embodiment.

FIG. 10 shows a schematic example of the contents of the processes at the contents server 21 of the present embodiment. The contents server 21 monitors the reception of a service request transmitted by the gateway 22 (step S85: Y) and, when it is detected (step S85: Y), it identifies the type of the contents service specified by the service request. At step S86, the contents server 21 reads the relevant contents data from the contents data storage unit 81. At step S87, the contents data transmission unit 82 transmits the read contents data to the gateway 22.

A specific description will now be made on the operation of the access right managing system of the invention having the above-described configuration.

Figure 11:
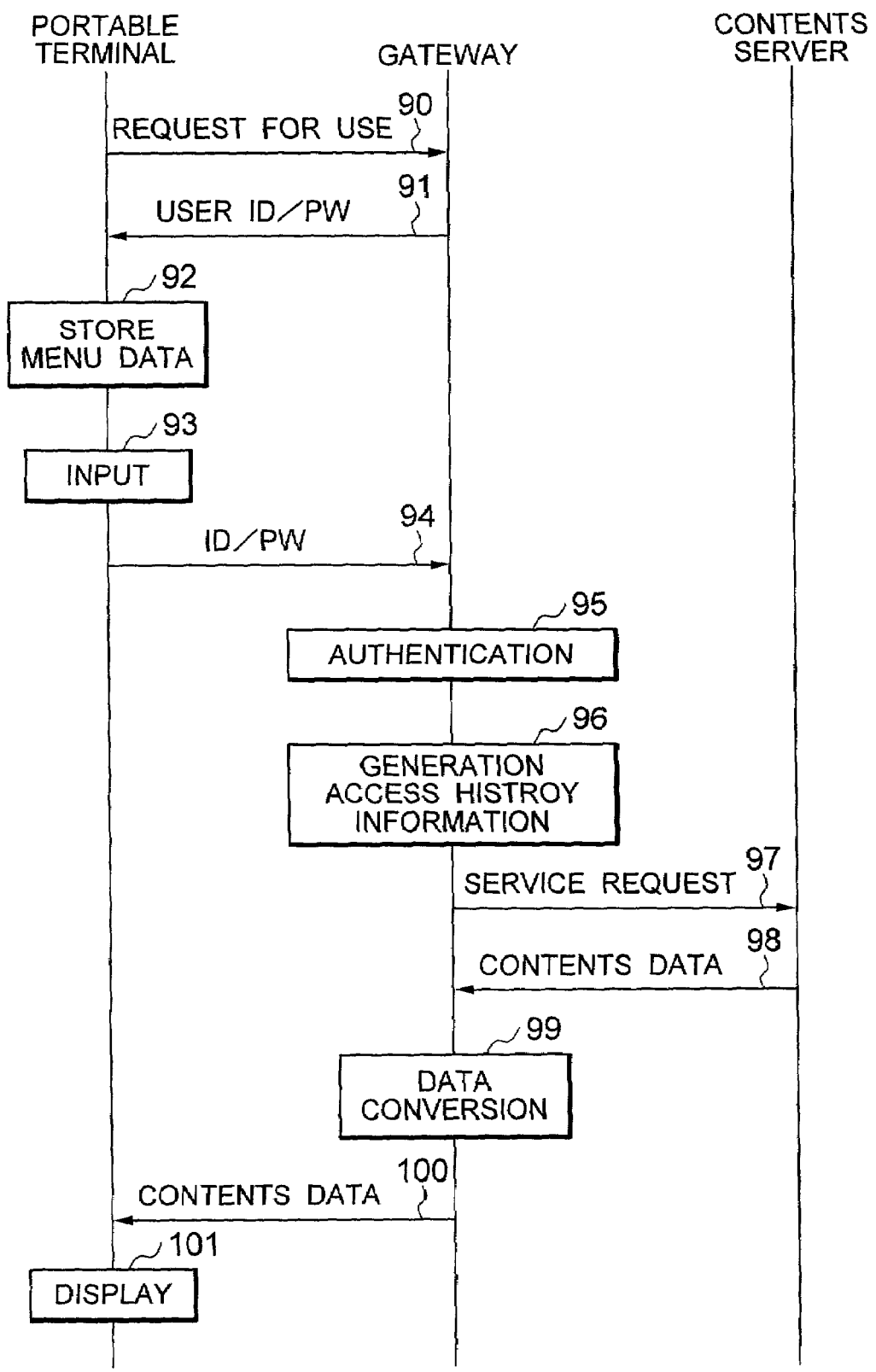
FIG. 11 is a sequence diagram showing a sequence of operations performed by the access right managing system of the embodiment at the first access from the portable terminal.

FIG. 11 schematically shows a sequence of operations of the access right managing system of the present embodiment at the time of the first access from the portable terminal 20. A user selects the first access screen on the portable terminal 20 to transmit a request for use 90 which specifies the address of a desired destination of access. Upon receipt of the request for use 90, the gateway 22 assigns a user ID and a user PW. Further, the gateway 22 returns the user ID and user PW to the portable terminal 20 along with menu data associated with the contents service to be accessed (user ID/PW 91). Upon receipt of the user ID and user PW, the portable terminal 20 displays the ID and PW on the display unit. The menu data which are simultaneously received are stored in the storage device and are registered in the access request screen (storage 92). Thereafter, the portable terminal 20 prompts the user to select the updated access request screen and displays the access request screen on the display unit. When the user selects a desired destination of access, the ID and PW associated therewith are accepted (input 93), and the ID and PW are transmitted to the gateway 22 (ID/PW 94). The gateway 22 compares the ID and PW with a user ID and PW assigned in advance to authenticate the user (authentication 95). If the authentication has a positive result, access history information as shown in FIG. 7 is generated (generation 96).

As a result, an access right is granted for a predetermined effective period that starts from the current date of access and, for example, tolling is thereafter conducted on the basis of packets which are units for data transfer each time contents data are acquired by accessing the contents service.

Thereafter, a service request 97 is transmitted to the contents server 21 to acquire the contents data for which the request for use has been made. The contents server 21 acquires the contents data associated with the received service request 97 and returns it to the gateway 22 (contents data 98). The gateway 22 converts the received contents data 98 into a data format corresponding to the mode of display of the display unit of the portable terminal 20 (conversion 90). For example, the data are converted into the WML format or the like. The converted contents data are transferred to the portable terminal 20 (contents data 100). The portable terminal 20 displays the received contents data on the display unit by means of the browser function incorporated therein (display 101).

Figure 12:
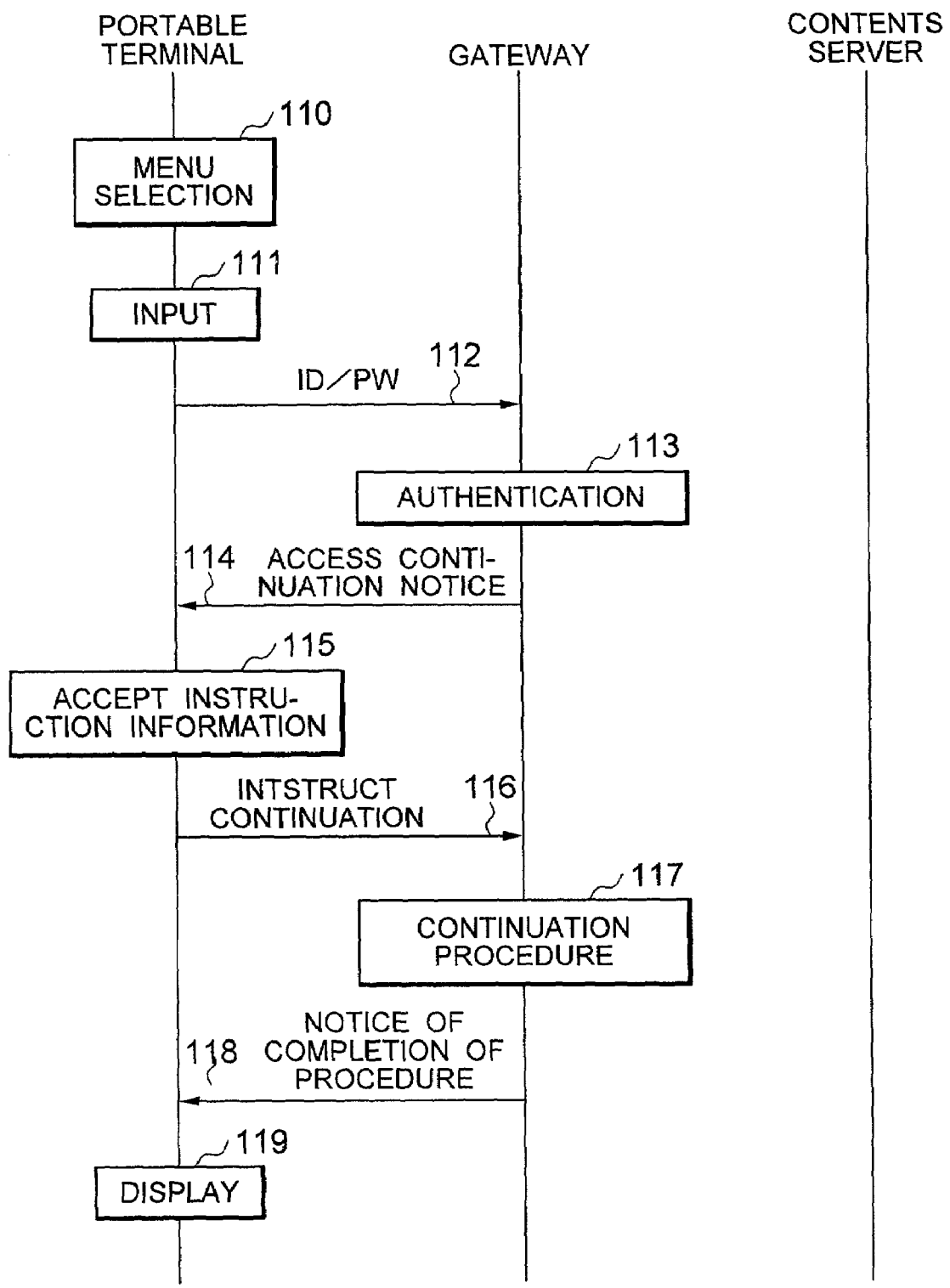
FIG. 12 is a sequence diagram showing a sequence of operations performed by the access right managing system of the embodiment when an effective period expires after an access right is once granted.

FIG. 12 schematically shows a sequence of operations of the access right managing system in the case in which the effective period expires after an access right is once granted to a portable terminal 20. When the user selects the access request screen on the portable terminal 20 (selection 100) to specify a desired access and inputs an ID and PW assigned to the user in advance according to the screen (input 111), the portable terminal 20 transmits the ID and PW to the gateway 22 (ID/PW 112). The ID and PW are transmitted as a request for use. Upon receipt of the request for use, the gateway 22 compares the ID and PW with an ID and PW assigned in advance to authenticate the user (authentication 113). In this case, the authentication provides a negative result because the effective period of the access right has already expired. Then, the gateway 22 reads screen data for an access right continuation notice prepared in advance from the storage device and transmits the screen data for an access right continuation notice to the portable terminal 20 (access right continuation notice 114). Upon receipt of the access right continuation notice, the portable terminal 20 displays the access right continuation notice on the display unit. Further, the portable terminal 20 prompts the user to input instruction information indicating whether he or she instructs continuation according to the screen (acceptance 115) and transmits the accepted instruction information to the gateway 22 (instruction 116). When an access right continuation instruction is sent by the user, the gateway 22 takes a predetermined access right continuation procedure 117 such as regeneration of the access history information and notifies the portable terminal 20 when the procedure is completed (notice 118). Upon receipt of the notice of completion of the procedure, the portable terminal 20 displays the access right continuation notice on the display unit (display 119) to notify the user of the fact that the access right is maintained.

As described above, in the access right managing system according to the invention, the gateway 22 is provided to manage right of the portable terminal 20 to access data of various contents services stored in the contents server 21 on the Internet. When the gateway 22 receives a request for use intended for the first access from the portable terminal 20, it assigns a user ID and PW to the same. The gateway 22 transmits the assigned user ID and user PW to the portable terminal 20. When another request for use added with the same ID and PW is received, access history information is generated after authenticating the user. Further, an access right is granted for which a predetermined effective period starting at the date of the first access is set. When the portable terminal 20 accesses within the effective period, the contents server 21 is requested to acquire the contents data requested by the portable terminal 20. After the received contents data are converted into a data format in compliance to the mode of display of the portable terminal 20, the converted contents data are transferred to the portable terminal 20.

In the case of an access from the portable terminal 20 which is out of the effective period, the access to the contents server is interrupted, and an access right continuation notice is returned to encourage continuation of the access right. As a result, it is possible to grant a simple access right having an effective period starting at the time of the first access. This makes it possible to eliminate inconvenience attributable to inability to use contents until user registration is completed from the time of the request for use while minimizing the problem of security and to eliminate the need for tiresome operations such as updating a tentative ID to an official ID.

By setting a limit on the use of an access right, it is possible to effectively use a capacity of a system which must otherwise be allocated to the access rights to be managed by the system. Further, the processing load required for the management of access rights can be significantly reduced. Furthermore, since the gateway 22 converts data into a display data format optimum for the portable terminal 20 regardless of the data format of contents data stored in the contents server 21, the processing load of the portable terminal 20 can be reduced. Since contents data are managed by the contents server 21, there is no need for incorporating the application software in the portable terminal 20. This makes it possible to accommodate any new contents services in the future because data of such contents services can be easily added to and deleted from the portable terminal 20. It is therefore possible to provide a contents service which is available with easier procedures and which is flexible for both of servers who provide various services and clients who receive such services based on rights to access to a network system.

Although the access right managing system of the present embodiment has been described on an assumption that an effective period for an access right is set using the date of the first access as the time of the first access when the period starts, this is not limiting the invention. For example, the date and time of the first access may be used as the time of the first access.

Although the access right managing system of the present embodiment has been described with reference to an access right which is valid for a predetermined effective period from the date of the first access as the time of the first access, this is not limiting the invention. For example, the same effect can be achieved by granting a valid access right within a predetermined effective period that starts at the data or date and time of the latest access which is the time of the latest access.

In the access right managing system of the present embodiment, when a request for use intended for the first access is made by the portable terminal, a user ID and PW are assigned to them immediately and transmitted to the portable terminal. However, this is not limiting the invention. For example, when there is such a request for use intended for the first access, the gateway 22 may assign a user ID and PW and transmit them to the portable terminal after confirming the intention to use a contents service with the portable terminal 20. This makes it possible to prevent access history information from being uselessly generated when the user transmits a request for the first use from the portable terminal as a result of an erroneous operation.

As described above, according to the first, ninth, eleventh or thirteenth aspect of the invention, by granting a simple access right having an effective period from the first access, it is possible to effectively use a capacity which must otherwise be allocated to the access rights of users to be managed. Further, the processing load required for the management of access rights can be significantly reduced.

According to the second, tenth, twelfth or fourteenth aspect of the invention, it is possible to grant simple access rights for which access history information associated with the management of the access rights is limited to an effective period starting at the time of the first access. This makes it possible to minimize the problem of security, to prevent persons other than the users from easily using the contents services and to eliminate inconvenience attributable to inability to use contents until user registration is completed from the time of the request for use.

According to the third aspect of the invention, it is possible to prevent access history information from being uselessly generated when a user of the portable terminal transmits a request for the first access as a result of an erroneous operation.

According to the fourth aspect of the invention, a permission for access can be easily issued to avoid the problem of security by granting an access right having an effective period, and access can be granted semi-permanently if the user wishes so as in the prior art through a process for continuation of the access right associated with such an effective period. This consequently makes it possible to simplify the management and registration of access rights of users.

According to the fifth or fifteenth aspect of the invention, the gateway converts data into a display data format which is optimum for the portable terminal regardless of the data format of contents data stored in the contents server. This makes it possible to reduce the processing load of the portable terminal.

Moreover, according to the sixth aspect of the invention, a request for use of an access right is determined to be valid when it is within a predetermined effective period that starts from the date and time of the latest access. Similarly to the first aspect of the invention, this makes it possible to effectively use a capacity of a system which must otherwise be used for access rights of users to be managed and to reduce the load of processing required for the management of access rights significantly.

According to a seventh aspect of the invention, since the contents data transfer means converts data performs conversion into contents data described in the Wireless Markup Language, the invention can be easily applied to a WAP system.

According to the eighth aspect of the invention, the invention can be applied to contents services utilizing portable telephones which are increasing at a remarkable pace to provide the effects of the efficient use of a capacity at servers associated with the management of access rights and the reduction of the processing load, which contributes to construction of communication systems at a low cost.

Furthermore, according to the sixteenth or seventeenth aspect of the invention, it is possible to provide a contents service which is available with easier procedures and which is flexible for both of servers who provide various services and clients who receive such services based on rights to access to a network system.

What is claimed is:

1. An access right managing system having a portable terminal, a gateway and a contents server, wherein:
the portable terminal comprises;
use request transmitting means for transmitting a request for use of a contents service,
contents data receiving means for receiving contents data corresponding to the use request transmitted by the use request transmitting means, and
display means for displaying information such as characters based on the contents data received by the contents data receiving means, and wherein:
the gateway comprises;
use request receiving means for receiving the use request transmitted by the use request transmitting means,
access history information storing means for storing access history information including the time of the first access and a predetermined effective period each time an access is made to the contents service requested by the use request transmitted by the use request transmitting means,
access validity determining means for determining whether the use request received by the use request receiving means is within the effective period that starts at the time of the first access based on the access history information stored in the access history information storing means,
acquisition requesting means for transmitting a request for acquisition of contents data when the use request is determined to be within the effective period by the access validity determining means,
acquisition-requested contents data receiving means for receiving contents data corresponding to the request for acquisition transmitted by the acquisition requesting means, and
contents data transfer means for transferring the contents data received by the acquisition-requested contents data receiving means to the portable terminal, and wherein:
the contents server comprises;
contents data storing means for storing contents data associated with each contents service in advance, and
contents data transmitting means for reading the contents data requested by the acquisition requesting means from the contents data storing means and for transmitting the same to the gateway,
wherein, when the use request is a first use request made by the portable terminal to the gateway for access to information in the contents server, the gateway assigns a password and identification number (ID) to the use request and sends the password and ID as authentication information to the portable terminal, to be sent by the portable terminal together with all future use requests output by the portable terminal to the gateway for access to information in the contents server,
wherein the time of the first access stored in the access history information storing means corresponds to a time when the contents server was first accessed by the portable terminal,
wherein the predetermined effective time corresponds to a time period starting at the time of the first access, and ending at a fixed time period after the time of the first access, and
wherein the portable terminal is granted use of the contents service by way of a plurality of different sessions with said contents server within the predetermined effective time, even when a disconnect period or periods exists between an operative time of any two the plurality of different sessions that are closest in operative time to each other.

2. An access right managing system having a portable terminal, a gateway and a contents server, wherein:

the portable terminal comprises;

first use request transmitting means for transmitting a request for use of a contents service, identification information receiving means for receiving predetermined identification information corresponding to the use request transmitted by the first use request transmitting means, identification information accepting means for accepting the input of an identifier and a password for the request for use of the contents service, second use request transmitting means for transmitting a use request including the identifier and password accepted by the identification information accepting means, contents data receiving means for receiving contents data corresponding to the use request transmitted by the second use request transmitting means, and display means for displaying information such as characters based on the contents data received by the contents data receiving means, and wherein:

the gateway comprises;

use request receiving means for receiving the use request transmitted by the use request transmitting means, first access request determining means for determining whether the use request received by the use request receiving means is the first request for access to the contents service, identification information transmitting means for assigning an identifier and a password to the request when it is determined to be the first access request by the first access request determining means and for transmitting the same to the portable terminal, authenticating means for authenticating the use request based on the identifier and password transmitted by the identification information transmitting means when it is determined not to be the first access request by the first access request determining means, access history information generating means for generating access history information including the time of the first access and a predetermined effective period each time an access is made to the contents service requested by the use request when the use request is authenticated by the authenticating means, access validity determining means for determining whether the use request received by the use request receiving means is within the effective period that starts at the time of the first access based on the access history information generated by the access history information generating means, acquisition requesting means for transmitting a request for acquisition of contents data when the use request is determined to be within the effective period by the access validity determining means, acquisition-requested contents data receiving means for receiving contents data corresponding to the request for acquisition transmitted by the acquisition requesting means, and contents data transfer means for transferring the contents data received by the acquisition-requested contents data receiving means to the portable terminal, and wherein:

the contents server comprising;

contents data storing means for storing contents data associated with each contents service in advance, and contents data transmitting means for reading the contents data requested by the acquisition requesting means from the contents data storing means and for transmitting the same to the gateway, wherein the portable terminal is granted use of the contents service by way of a plurality of different sessions with said contents server within the predetermined effective time, even when a disconnect period or periods exists between an operative time of any two the plurality of different sessions that are closest in operative time to each other.

3. An access right managing system as claimed in claim 2, wherein the identification information transmitting means confirms with the portable terminal whether to access to the contents service for which the use request has been made before transmitting the assigned identifier and password to the portable terminal.

4. An access right managing system as claimed in claim 1, wherein the gateway comprises:

continuation notice transmitting means for transmitting a predetermined access right continuation notice to the portable terminal when the access validity determining means determines that the use request is not within the effective period; and continuation process means for performing a predetermined access right continuation process based on instruction information received from the portable terminal corresponding to the access right continuation notice transmitted by the continuation notice transmitting means, and wherein the portable terminal comprises;

instruction information accepting means for receiving the access right continuation notice and for accepting the instruction information on whether to continue to hold the access right based on the same notice; and instruction information transmitting means for transmitting the instruction information accepted by the instruction information accepting means to the gateway.

5. An access right managing system as claimed in claim 1, wherein the contents data transfer means transfers the contents data received by the acquisition-requested contents data receiving means to the portable terminal after converting into a predetermined data format corresponding to the display mode of the display means of the portable terminal.

6. An access right managing system as claimed in claim 1, wherein the access history information includes the date of the latest access and a predetermined effective period and wherein an access within the effective period that starts from the date of the latest access is regarded valid.

7. An access managing system as claimed in claim 5, wherein the contents data transfer means converts into contents data described in the Wireless Markup Language.

8. An access right managing system as claimed in claim 2, wherein the gateway comprises:

continuation notice transmitting means for transmitting a predetermined access right continuation notice to the portable terminal when the access validity determining means determines that the use request is not within the effective period; and continuation process means for performing a predetermined access right continuation process based on instruction information received from the portable terminal corresponding to the access right continuation notice transmitted by the continuation notice transmitting means, and wherein the portable terminal comprises;

instruction information accepting means for receiving the access right continuation notice and for accepting the instruction information on whether to continue to hold the access right based on the same notice; and instruction information transmitting means for transmitting the instruction information accepted by the instruction information accepting means to the gateway.

9. An access right managing system as claimed in claim 2, wherein the contents data transfer means transfers the contents data received by the acquisition-requested contents data receiving means to the portable terminal after converting into a predetermined data format corresponding to the display mode of the display means of the portable terminal.

10. An access right managing system as claimed in claim 2, wherein the access history information includes the date of the latest access and a predetermined effective period and wherein an access within the effective period that starts from the date of the latest access is regarded valid.

11. An access managing system as claimed in claim 2, wherein the portable terminal is a portable telephone.

12. An access right managing system as claimed in claim 4, wherein the portable terminal further comprises:

display means for displaying the access right continuation notice for a user of the portable terminal; and input means for accepting the instruction information entered by way of the user.

13. An access right managing system as claimed in claim 1, wherein the contents server further comprises data converting means for converting the contents data stored therein into a display data format which is optimum for the portable terminal, and for outputting the converted contents data to the portable terminal, irrespective as to a current data format of the contents data and other contents data stored at the contents server.

14. An access right managing system as claimed in claim 3, wherein the contents server further comprises data converting means for converting the contents data stored therein into a display data format which is optimum for the portable terminal, and for outputting the converted contents data to the portable terminal, irrespective as to a current data format of the contents data and other contents data stored at the contents server.

* * * * *